United States Patent Office 2,699,438
Patented Jan. 11, 1955

2,699,438

LINEAR POLYESTERS OF CARBOXY-2-HYDROXY-METHYL BENZODIOXANE

Louis H. Bock and James K. Anderson, Shelton, Wash., assignors to Rayonier Incorporated, Shelton, Wash., a corporation of Delaware No Drawing. Application April 19, 1952, Serial No. 283,262

8 Claims. (Cl. 260—78.3)

This invention relates to synthetic linear condensation polymers and has for its object the provision of improved synthetic linear condensation polymers and formed articles such as filaments, films and molded articles made from the polymers, and a method of making the polymers and formed articles.

In one of its important embodiments, the invention provides a fiber forming linear polymer with a high degree of chemical stability, low solubility in water and in organic solvents, and the ability to absorb coloring material, i. e., to be readily dyed.

The linear polyesters of the invention are prepared from the hydroxy acid, carboxy-2-hydroxymethyl benzodioxane:

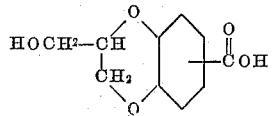

This acid is advantageously prepared from protocatechuic acid by reacting with epichlorohydrin according to the following equation:

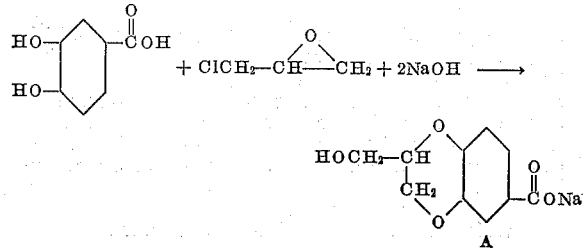

or

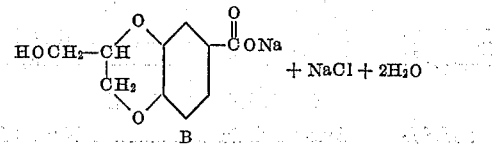

In the previous reaction two isomeric products are possible: 6-carboxy-2-hydroxymethyl 1,4-benzodioxane (A) or 7-carboxy-2-hydroxymethyl-1,4-benzodioxane (B). It appears that a mixture of these two isomers is actually obtained. For the purpose of this invention, however, it does not matter which of the above structures is actually formed or whether the product is a mixture of the two isomers.

Protocatechuic acid is obtainable by the alkaline degradation of sulfite waste liquor which is a by-product in the manufacture of cellulose from wood. Sulfite waste liquor is produced in great quantity and is of no economic value but is, in fact, a nuisance whose disposal is a serious problem to pulp and paper mills.

The linear polyester is obtainable by heating the free hydroxy acid to a temperature of 200°–300° C. under a vacuum or in the presence of an inert gas. The condensation that occurs may be illustrated by the following equation:

The preparation of the hydroxy acid and its condensation to a linear polymer is illustrated by the following examples:

EXAMPLE 1

*Preparation of 6 (or 7)-carboxy-2-hydroxymethyl-1,4-benzodioxane*

One hundred parts of sodium hydroxide was dissolved in 945 parts of water. The solution was added to 187 parts of protocatechuic acid in an atmosphere of oxygen-free nitrogen. The resulting solution was cooled to 40°–50° C. and 112 parts of epichlorohydrin was added with mechanical stirring over a period of two hours maintaining the temperature at 40°–50° C. The reaction mixture was stirred at 40°–50° C. in an atmosphere of nitrogen for 7 hours and then poured into 240 parts of hydrochloric acid with rapid stirring. A heavy oil separated but after prolonged stirring it solidified. The solid was broken up, filtered, washed with water, and dried in an oven at 110° C. One hundred eighty-six parts of crude 6 (or 7)-carboxy-2-hydroxymethyl-1,4-benzodioxane was obtained. The product was highly discolored and melted over a wide range of temperature. The hydroxy acid was converted to the methyl ester by dissolving 186 parts of the crude acid in 374 parts of methanol, saturating the solution with dry HCl, and refluxing for 24 hours. The excess methanol and HCl was then evaporated away under reduced pressure and the methyl ester was distilled collecting that fraction which boiled at 175°–196° C. at a pressure of 0.38 to 1.50 mm. of mercury. The yield of ester was 115.3 parts. This ester was a viscous liquid. Saponification of this ester was accomplished by adding it to a solution of 60 parts of sodium hydroxide and 250 parts of water, refluxing two hours in an atmosphere of nitrogen, and then acidifying with hydrochloric acid. Upon acidification, a slightly discolored oil formed which soon became completely crystalline. The product was recrystallized by dissolving it in the minimum amount of boiling water, adding 2 or 3 parts of decolorizing charcoal, and filtering hot. After two such recrystallizations the product was dried in a vacuum oven at 50°–60° C. The yield was 73.8 parts of a colorless, crystalline product which melted at 141°–168° C. Analysis gave a neutral equivalent of 212 compared with a theoretical value of 210 for the compound, $C_{10}H_{10}O_5$.

EXAMPLE 2

*Condensation of 6 (or 7)-carboxy-2-hydroxymethyl-1,4-benzodioxane to a linear polyester*

6 (or 7)-carboxy-2-hydroxymethyl-1,4-benzodioxane was placed in a stainless steel bomb surrounded by an electric heating jacket. The bomb was connected to a vacuum system and was heated to 270° C. while maintaining the pressure at 0.2 mm. of mercury for 17 hours. The product was a light amber glass-like solid softening at 145° C. and melting at 200°–215° C. The intrinsic viscosity, as measured in o-chlorophenol solution, was found to be 0.44. The product was insoluble in water, alcohol, acetone and the common organic solvents. It could be dissolved in hot o- or m-cresol, dimethyl formamide or a 1:3 mixture of phenol and tetrabromoethane.

EXAMPLE 3

The following is an example of an operation for the spinning of filaments in the production of fibers:

The polymer prepared in Example 2 was extruded from the bomb in which it was condensed by replacing the bottom plate of the bomb with a stainless steel disc containing a hole 0.016 inch in diameter. The polymer was heated to a temperature of 265° C. and nitrogen pressure of 150 pounds was applied. The extruded fiber was taken over a godet wheel at a peripheral speed of 30 meters per minute and wound on a reel at a higher

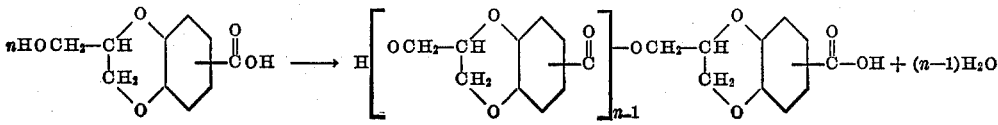

speed to give a stretch to the fiber. When given no stretch, the fiber had a denier of 10.7 and tenacity of 1.62 grams per denier at an elongation of 164%. When given a stretch of 220% the denier was 6.6, the tenacity 4.2 grams per denier and the elongation 35%. The fiber was dyed by immersing in a boiling aqueous bath of Eastone Red B.

The occurrence of stereoisomeric monomer units in a polymer gives a heterogeneous character to the polymer and probably accounts for the low softening point. In an effort to raise the softening point, a separation of the isomeric acids was effected by acetylating the crude acid and fractionally crystallizing the acetylated product. An acid was obtained which melted at 182°–188° C. compared to 141°–168° C. for the mixture of isomers normally obtained. The high melting product had the same analysis as the lower melting material and is believed to be a pure isomer.

Condensation of this high melting isomer gave a polymer which melted only with decomposition above 300° C. Since the solid state was reached before the condensation had proceeded far enough to give a polymer suitable for a synthetic fiber and since further condensation could not be achieved in the solid state, a polymer suitable for spinning was never obtained from this material. Attempts to carry out the condensation in a solvent were unsuccessful because the condensation would not go under conditions that the solvent was not removed by distillation. Attempts were also made to mix the high melting acid with the normal mixture of isomers in varying ratios and carry out the condensation. This was also not successful in raising the softening point of the polymer, although the melting point could be raised. The high melting acid was also copolymerized with other hydroxyacids but these copolymers all had very low softening points.

The polymer obtained by this process can also be molded into various shapes such as ribbons, sheets or tubes.

We claim:
1. The linear polyester obtained by the condensation at a temperature of from 200° to 300° C. in an inert atmosphere of a carboxy-2-hydroxymethyl benzodioxane of the following structure:

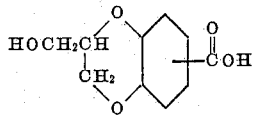

2. The linear polyester obtained by the condensation at a temperature of from 200° to 300° C. under vacuum of stereoisomers of carboxy-2-hydroxymethyl benzodioxane of the following structure:

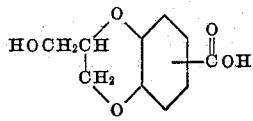

3. An extruded product formed by the extrusion of the linear polyester of claim 2 when in a molten state.

4. Filaments suitable for yarns and fabrics formed by the extrusion of the linear polyester of claim 2 when in a fluid state.

5. The method of forming a linear polyester which comprises condensing a mixture of the stereoisomers

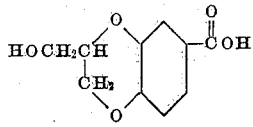

and

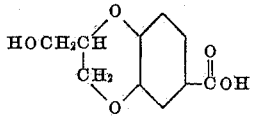

at a temperature of from 200° to 300° C. in an inert atmosphere and forming a linear polyester having a lower melting point than a linear polyester formed of but one of the isomers.

6. The linear polyester formed by the condensation at a temperature of from 200° to 300° C. in an inert atmosphere of a mixture of stereoisomers

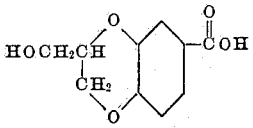

and

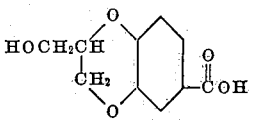

said polyester melting at from 200° to 215° C. and which can be heated to a temperature of at least 265° C. without decomposition.

7. An extruded product formed by the extrusion of the linear polyester of claim 6 when in a molten state.

8. Filaments suitable for yarns and fabrics formed by the extrusion of the linear polyester of claim 6 when in a fluid state.

References Cited in the file of this patent

UNITED STATES PATENTS

| | | |
|---|---|---|
| 2,471,023 | Cook et al. | May 24, 1949 |
| 2,551,731 | Drewitt et al. | May 8, 1951 |

FOREIGN PATENTS

| | | |
|---|---|---|
| 565,573 | Great Britain | Nov. 16, 1944 |